(12) United States Patent
Sampath et al.

(10) Patent No.: US 7,130,657 B1
(45) Date of Patent: Oct. 31, 2006

(54) METHODS AND SYSTEMS FOR IMPROVING FRAME SELECTION IN WIRELESS COMMUNICATIONS NETWORKS

(75) Inventors: Ashwin Sampath, Somerset, NJ (US); On-Ching Yue, Middletown, NJ (US); Qinqing Zhang, Morganville, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 1104 days.

(21) Appl. No.: 09/693,938

(22) Filed: Oct. 23, 2000

(51) Int. Cl.
*H04B 1/38* (2006.01)

(52) U.S. Cl. .................. 455/561; 455/452.2; 455/137; 370/332; 370/479; 714/701; 714/746

(58) Field of Classification Search .............. 455/561, 455/450, 575, 550, 432, 433, 425, 501, 67.11, 455/67.14, 442, 522, 69, 331, 574, 423, 575.1, 455/550.1, 432.2, 432.1, 515, 436, 449, 445, 455/422.1, 452.2, 101, 67.13, 422, 273, 135, 455/277.1, 277.2, 456.5, 456.6; 370/465, 370/335, 348, 347, 471, 337, 252, 331, 209, 370/349, 479, 328, 332; 700/83, 24, 25, 700/86, 87; 709/102, 223, 227, 318; 375/244; 714/701, 746, 747, 780, 788, 758, 751
See application file for complete search history.

(56) References Cited

U.S. PATENT DOCUMENTS

| | | | | |
|---|---|---|---|---|
| 5,490,153 A | * | 2/1996 | Gregg et al. ................ 371/32 |
| 5,886,645 A | * | 3/1999 | Eaton ........................ 340/7.22 |
| 5,974,584 A | * | 10/1999 | Hendrickson et al. ...... 714/800 |
| 6,222,830 B1 | * | 4/2001 | Padovani et al. ........... 370/332 |
| 6,226,283 B1 | * | 5/2001 | Neumiller et al. .......... 370/340 |
| 6,246,878 B1 | * | 6/2001 | Wallentin ................... 455/442 |
| 6,353,742 B1 | * | 3/2002 | Bach .......................... 455/453 |
| 6,381,232 B1 | * | 4/2002 | Strawczynski et al. ..... 370/333 |
| 6,631,126 B1 | * | 10/2003 | Berliner et al. ............ 370/342 |
| 6,754,495 B1 | * | 6/2004 | Kusaki et al. .............. 455/436 |

* cited by examiner

Primary Examiner—Edward F. Urban
Assistant Examiner—Charles Chow

(57) ABSTRACT

Methods and systems are provided for improving frame selection in wireless communications networks. During decoding of a frame, a base station generates an error burst representation associated with error bursts and stores the representation within the frame, thus forming an enhanced frame. The base station then transfers the enhanced frame to a network controller. A frame selection unit ("FSU") within the network controller thereafter applies frame selection to the enhanced frame. The error burst representation can be analyzed to determine the quality of the enhanced frame. A "combined" frame, generated by combining an "acceptable" portion of the enhanced frame and an acceptable portion of a copy of the enhanced frame, can then be generated to substantially eliminate errors. The present frame selection methods and systems enable superior quality frames to be passed on to higher layers in a network's communications protocol (hereafter collectively referred to as "network").

66 Claims, 14 Drawing Sheets

METHODS AND SYSTEMS FOR IMPROVING FRAME SELECTION IN WIRELESS COMMUNICATIONS NETWORKS

BACKGROUND OF THE INVENTION

In Code Division Multiple Access (CDMA) wireless communications networks, data frames ("frames") transferred by network elements often comprise errors that degrade the quality of information exchanged within such networks. Therefore, it is often necessary to identify errors within frames and to process the frames according to their error content so that frames of sufficient quality are selected to be passed on to higher layers in the network's communication protocol ("layers"). In general, the identification of errors within frames and the processing and transferring of frames is known as "frame selection".

CDMA wireless networks support so-called "soft handoffs". During a soft handoff, a primary frame and at least one copy of the primary frame, or "parallel" frame, are generated by different network elements. Before passing either the primary frame or the parallel frame on to higher layers in the network, it is necessary to determine which copy has superior quality. This is achieved by applying frame selection to each copy.

One example of a CDMA network is a Universal Mobile Telecommunications System ("UMTS") network. A UMTS network is based on 5 MHz Wideband CDMA ("W-CDMA") and is optimized for support of so-called "third generation services", which include multimedia-capable mobile communications. FIG. 1 provides an exemplary diagram of a UMTS network 1.

Referring to FIG. 1, UMTS network "N" comprises core network 10, access network 20, mobile 30 (e.g., cellular telephone), Operations Administration and Maintenance ("OAM") unit 40, Public Switched Telephone Network ("PSTN")/Integrated Services Digital Network ("ISDN") 50, and Internet/Intranet Service Provider ("ISP") 60. Access network 20 comprises base stations 21a and 21b and network controllers or Serving Radio Network Controllers ("SRNCs") 22a and 22b. Base stations 21a and 21b communicate with SRNC 22a or 22b via wired links (known as "IUB interfaces") 3a and 3b. SRNCs 22a and 22b perform resource management functions and control base stations 21a and 21b, respectively, providing them access to core network 10. Frame selection units ("FSUs") 23a and 23b are located within SRNCs 22a and 22b, respectively, and are responsible for performing frame selection. Mobile 30 communicates with base stations 21a and 21b via wireless links 1a and 1b. SRNCs 22a and 22b communicate with each other via a wired link (known as an "IUR interface") 4 and communicate with the core network 10 via wired links (known as "IU interfaces") 5a and 5b. Core network 10 has connections 6, 7 and 8 to OAM unit 40, PSTN/ISDN 50 and ISP 60, respectively.

In UMTS network N, mobile 30 transmits signals in the form of frames to base stations 21a and/or 21b. Frames are transmitted at successive, fixed time increments. A single frame comprises data bits that make up part of a complete signal. These frames also comprise "transport blocks", which are basic units of data exchange. The size of a transport block (i.e., number of bits) is service-dependent. When a base station 21a or 21b receives a frame from mobile 30, the base station demodulates and decodes the frame to form a decoded frame. The base station 21a or 21b transfers the decoded frame to SRNC 22a or 22b at fixed time increments. Each frame comprises at least one decoded transport block and important information about the data within the transport block. Frames transferred to the SRNC 22a or 22b may comprise errors generated during transmission or decoding. FSUs 23a or 23b within SRNC 22a or 22b are adapted to apply frame selection to the transferred frames to analyze errors within the frames and process the frames according to their error content.

As noted above, frame selection is required when a mobile is in soft handoff (also called "diversity handover"). Soft handoff is designed to, among other things, enhance network quality by passing multiple copies of the same data to SRNCs. When mobile 30 is in a soft handoff mode, a primary base station 21a and at least one parallel base station 21b are in communication with the mobile 30. The primary base station 21a and parallel base station 21b both demodulate and decode a signal from the mobile 30. During a given time period, the primary base station 21a then transfers a primary frame to a primary SRNC 22a and then, if the parallel base station 21b is communicating with the primary SRNC 22a (which is not true in FIG. 1), the parallel base station 21b transfers a parallel frame (i.e., a frame, or "copy", decoded during the same time period and comprising its own decoded version of the same transport block and data as the primary frame) to that same SRNC 22a over an IUB interface. If the parallel base station 21b is communicating with a different, or parallel SRNC 22b (as shown in FIG. 1), the parallel base station 22b transfers the parallel frame to the parallel SRNC and the parallel SRNC 22b then transfers the parallel frame to the primary SRNC 22a over an IUR interface 4. FSU 23a within the primary SRNC 22a is thereafter responsible for applying frame selection to the received frames.

Frame selection is not, however, limited to soft-handoff conditions. Even when a mobile 30 is not in a soft handoff mode, an FSU 23a or 23b must determine if the received frames are of satisfactory quality. If the received frames comprise errors, the FSU 23a or 23b has to determine what action needs to be taken. For example, some services provided by the network may be able to make use of partially errored frames. This requires the FSU 23a or 23b to determine whether the quality of a frame exceeds a minimum threshold with respect to the nature of errors within the frame. Based on the outcome, the FSU 23a or 23b must then decide if the frame is to be passed on to higher layers in the network or discarded.

Existing frame selection methods typically involve determining a "metric" which will represent frame quality with adequate accuracy. A variety of "hard" metrics (i.e., measures of frame quality which indicate whether a frame is "good" or "bad") and "soft" metrics (i.e., measures of frame quality which indicate how good or bad a frame is based on a predetermined scale) have been studied. Cyclic redundancy check ("CRC") codes are examples of error detection codes that are based on a hard metric. In cases where CRCs are not used, other methods of error detection are necessary. These methods typically involve the comparison of a soft metric of frame quality to a predefined threshold. Based on results from CRCs or soft metrics, if at least one received copy of a frame is detected correctly, then the FSU 23a or 23b simply selects the correctly detected copy and sends it to a higher layer in the network. However, if each received copy of a frame comprises errors, the FSU 23a or 23b must discard the received copies, or select a "best" copy to pass on. In the case where FSU 23a or 23b selects a best copy and CRCs are used, FSU 23a or 23b must randomly select a copy, because there is no way to tell the relative quality of the copies. CRCs will indicate that a frame is "bad" even when only a small part of a frame comprises errors. When soft metrics are used, FSU 23a or 23b cannot always select the copy having the highest quality because the results of soft metrics tend to be unreliable. The inability to tell the relative quality among copies of errored frames results in poor frame selection.

It has been observed that errors in frames that are generated in wireless networks tend to form "error bursts". An error burst is a cluster, or burst, of errors that occur within a group of consecutive data bits in a frame. That is, error bursts are errors that tend to be concentrated within a group or multiple groups of consecutive bits, rather than scattered among singular bits. Errors occur in this manner because wireless channels vary slowly with time relative to typical data rates, and because of the inherent characteristics of convolutional code decoders or Turbo code decoders used in wireless networks. It is believed that knowledge of the fact that errors tend to be distributed in this manner can be used to provide more effective frame selection methods and systems.

Because errors often occur as error bursts, methods and systems for representing the location and length of errors to FSUs can be provided without using excessive amounts of IUB bandwidth. Furthermore, it is unlikely that error bursts will occur in the same parts of multiple frame copies. Therefore, it is believed that methods and systems can be provided for combining parts of frame copies to produce substantially error-free frames.

It is therefore a desire of the present invention to provide methods and systems for improving frame selection in wireless communication networks, based on the observation that errors in frames generated by wireless networks tend to form error bursts.

SUMMARY OF THE INVENTION

In accordance with the present invention, novel methods and systems are provided for selecting frames in a wireless communications network. The present invention envisions novel base stations and novel FSUs that are adapted to pass superior quality frames on to higher layers in the network.

Novel base stations envisioned by the present invention are adapted to generate error burst representations associated with starting locations and lengths of error bursts. The base stations are further adapted to store the error burst representations within frames, such that the frames become "enhanced" frames.

Novel FSUs envisioned by the present invention are adapted to process enhanced frames and to pass frames comprising minimal errors on to higher layers in the network. In order to accomplish this, the FSUs are adapted to evaluate a frame quality of enhanced frames by analyzing error burst representations within the enhanced frames. The FSUs are adapted to determine what actions to take with regard to enhanced frames based on the frame quality. Additionally, the FSUs are adapted to generate combined frames. These combined frames are generated by combining an "acceptable" portion (i.e., a portion comprising a minimal amount of errors) of an enhanced frame with an acceptable portion of a copy of the enhanced frame or an acceptable portion of a parallel enhanced frame. In this manner, combined frames that are error-free, or that comprise few errors, may be generated.

The novel base stations and FSUs envisioned by the present invention enable superior quality frames to be passed to higher layers in a network. The present invention and its advantages can best be understood with reference to the drawings, detailed description of the invention and claims that follow.

DETAILED DESCRIPTION OF THE INVENTION

The present invention provides novel methods and systems for improving frame selection in a wireless communications network. The methods and systems of the present invention are particularly useful in UMTS networks, but may be applied in other, similar networks as well.

Figure 1:
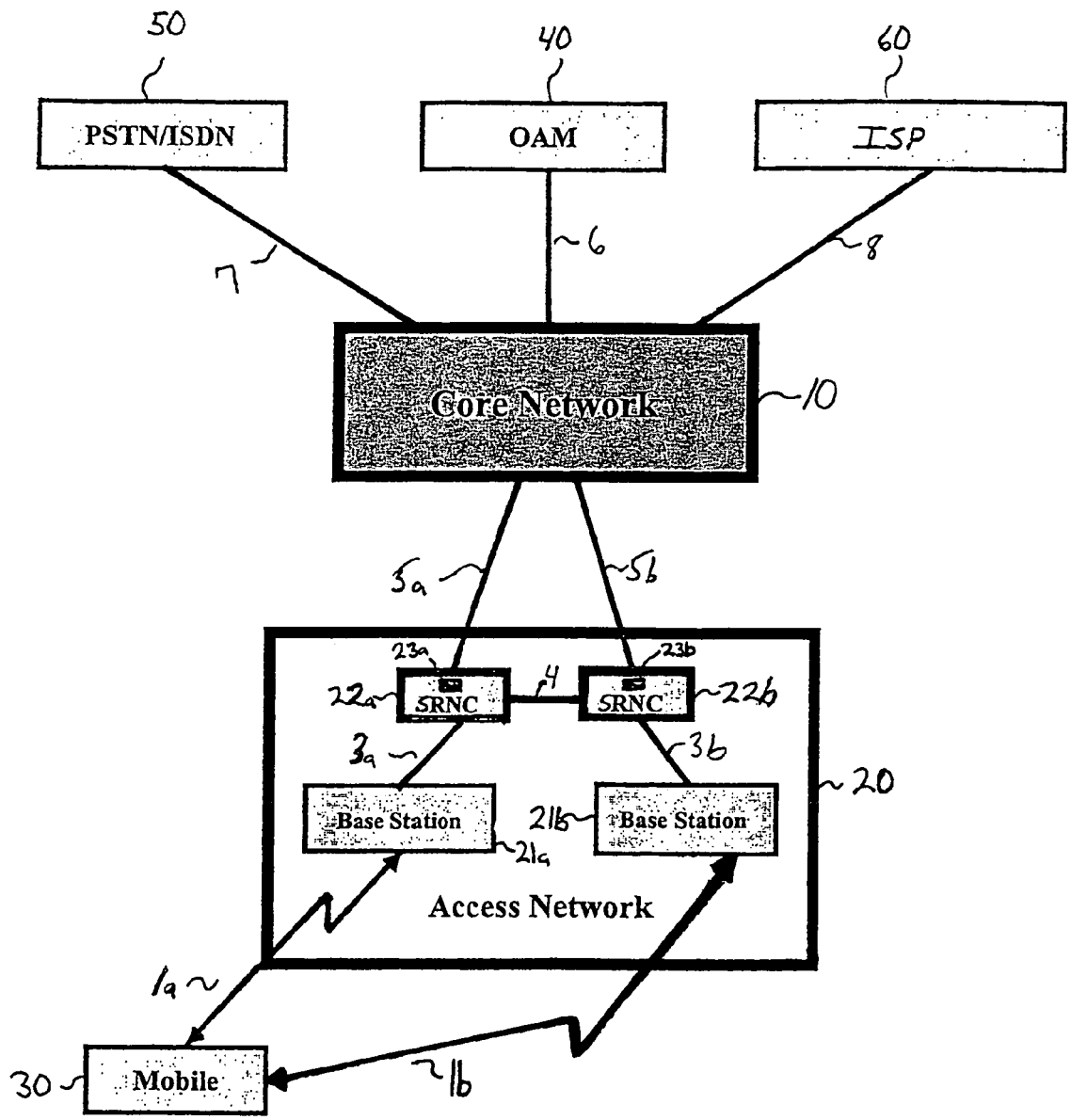
FIG. 1 is a representation of a UMTS network.
Figure 2:
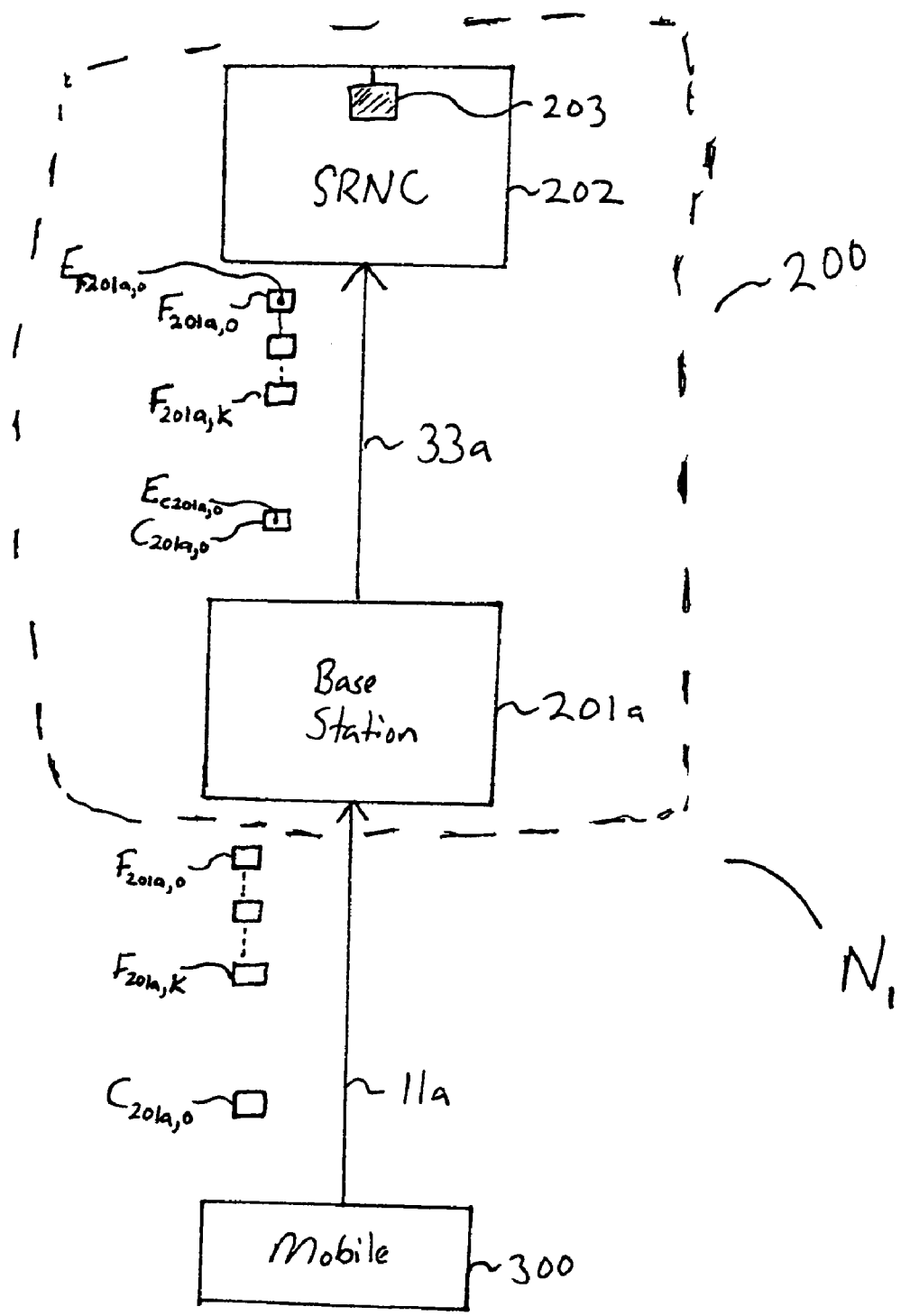
FIG. 2 is a representation of a UMTS sub-network.

FIG. 2 is a simplified representation of a UMTS sub-network $N_1$. Sub-network $N_1$ comprises access network 200 and mobile 300. Access network 200 comprises base station 201a and network controller or SRNC 202. SRNC 202 in turn comprises FSU 203.

Mobile 300 is adapted to sequentially transmit frames $F_{201a,0}$–$F_{201a,k}$ to base station 201a via wireless link 11a, where frame $F_{201a,0}$ is the first frame transmitted and $F_{201a,k}$ is the last frame transmitted. The term "k" within "$F_{201a,k}$" is an integer variable corresponding to the sequence number of the last frame. Frames $F_{201a,0}$–$F_{201a,k}$ are transmitted at fixed time intervals (e.g., 10 milliseconds). Base station 201a is adapted to demodulate and decode a frame $F_{201a,0}$–$F_{201a,k}$ as it is received via an uplink within wireless link 11a.

In an illustrative embodiment of the present invention, decoding a frame $F_{201a,0}$–$F_{201a,k}$, comprises: identifying at least one error burst within the frame $F_{201a,0}$–$F_{201a,k}$ if the frame $F_{201a,0}$–$F_{201a,k}$ comprises at least one error burst; generating an "error burst representation" associated with the error burst; and storing the error burst representation (not shown) within the frame $F_{201a,0}$–$F_{201a,k}$. Collectively, the method just described can be referred to as an error recognition process. Base station 201a is thereafter adapted to transfer the frame $F_{201a,0}$–$F_{201a,k}$ to SRNC 202 via IUB interface 33a. The base station 201a is adapted to demodulate, decode and transfer the rest of frames $F_{201a,0}$–$F_{201a,k}$ as they are received in sequence. A more detailed description of how base station 201a decodes, stores an error burst representation and transfers a frame will now be provided.

Consider the operation of base station 201a during a first time interval after receiving a frame $F_{201a,0}$. At this time, base station 201a is adapted to demodulate and decode frame $F_{201a,0}$. The format and content of frame $F_{201a,0}$ is as follows.

Figure 3:
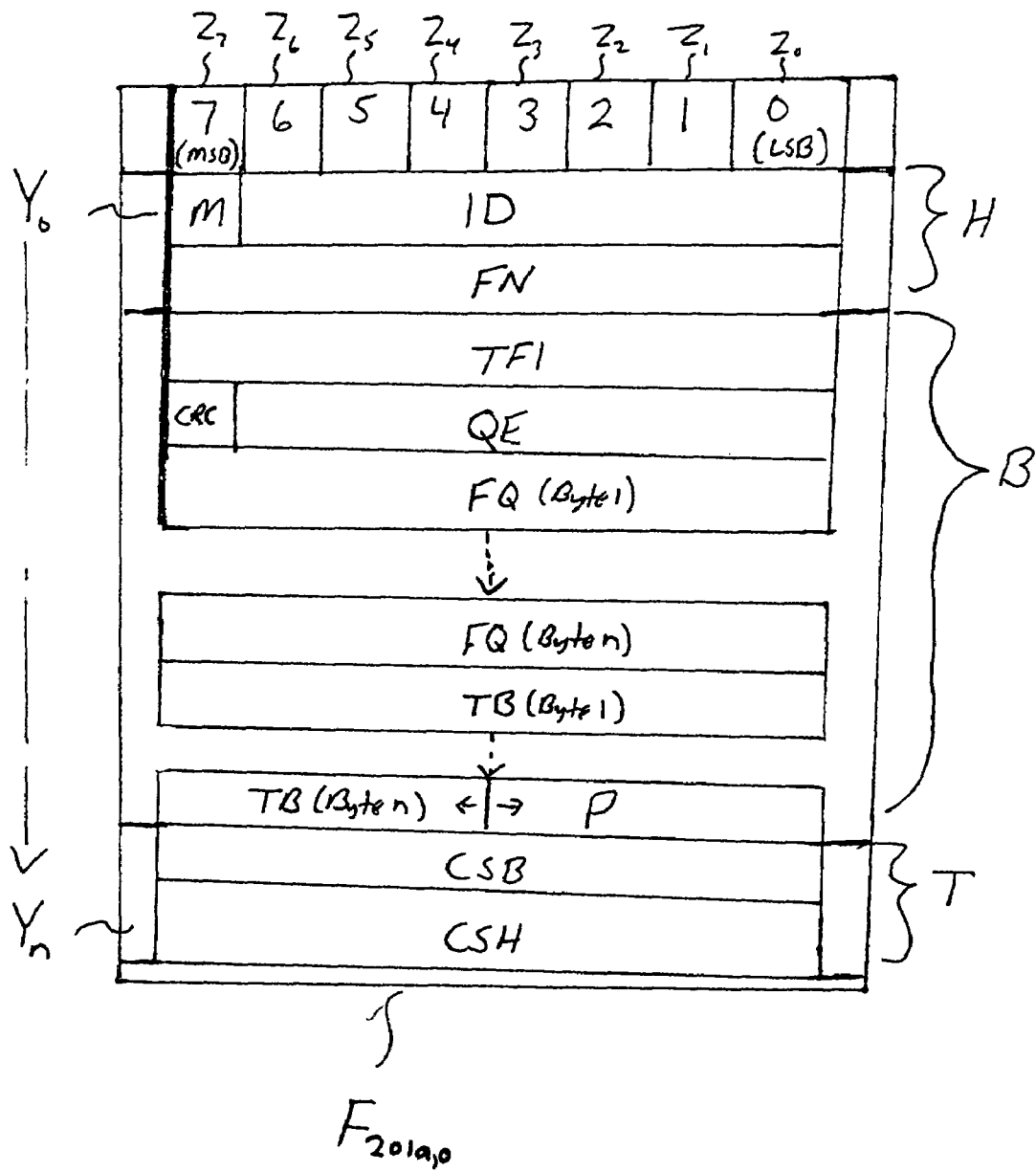
FIG. 3 is an illustrative example of a frame generated according to one embodiment of the present invention.

Referring to FIG. 3, frame $F_{201a,0}$ comprises bytes $Y_0$–$Y_n$, which are arranged in horizontal rows. Each of bytes $Y_0$–$Y_n$ comprises an eight-bit address, which comprises individual bits $Z_0$–$Z_7$. The bits $Z_0$–$Z_7$ are arranged in order from the lowest, or least significant bit ("LSB") $Z_0$, to the highest, or most significant bit ("MSB") $Z_7$. Frame $F_{201a,0}$ may also be viewed as comprising three main sections: header "H"; body "B"; and tail "T". Each of these sections comprise multiple "fields", each of which comprise a group of bits adapted to convey specific information.

Header H comprises the following fields: a mode field "M"; message identification field "ID"; and a frame number field "FN". Fields M and ID identify the frame, while the field FN refers to the frame number on which the transport block was received. Body B comprises the following fields: a decoded transport block field "TB"; a quality estimate field "QE" comprising information associated with radio link quality; a frame quality indicator field "FQ" adapted to store an error burst representation, which comprises information associated with an error burst that has occurred within the frame $F_{201a,0}$; a cyclic redundancy Check field CRC; a transport format indicator field "TFI"; and a padding field "P". The transport block field TB comprises a decoded transport block.

It should be understood that the number of bits/bytes allocated for field FQ in this embodiment is merely for illustrative purposes. In general, the length of the field FQ may comprise any number of bits. Increasing the length of this field, however, yields increased IUB bandwidth, which is utilized by overhead information rather than data. Optionally, fields QE and FQ may be combined to comprise a single field having a certain group of bits dedicated to radio link quality information and another group of bits dedicated to frame quality information. For purposes of this example, it is assumed that field FQ comprises a length of twelve bits.

Continuing, field CRC indicates the result of the cyclic redundancy check for the transport block—this field merely indicates whether the frame is "good" or "bad" (i.e., detected with or without errors) as received by base station 201a. Field TFI indicates the format that is being used to transport data. Field P comprises zero to seven bits, as required, in order to make the total number of bits within frame $F_{201a,0}$ an integer multiple of bytes. For purposes of this example, it is assumed that the frame $F_{201a,0}$ comprises eighty bits.

Tail T comprises a body check sum field "CSB" and a header check sum field "CSH". The check sum fields CSB and CSH indicate whether the SRNC 202 correctly received the body B and header H, respectively.

Figure 4:
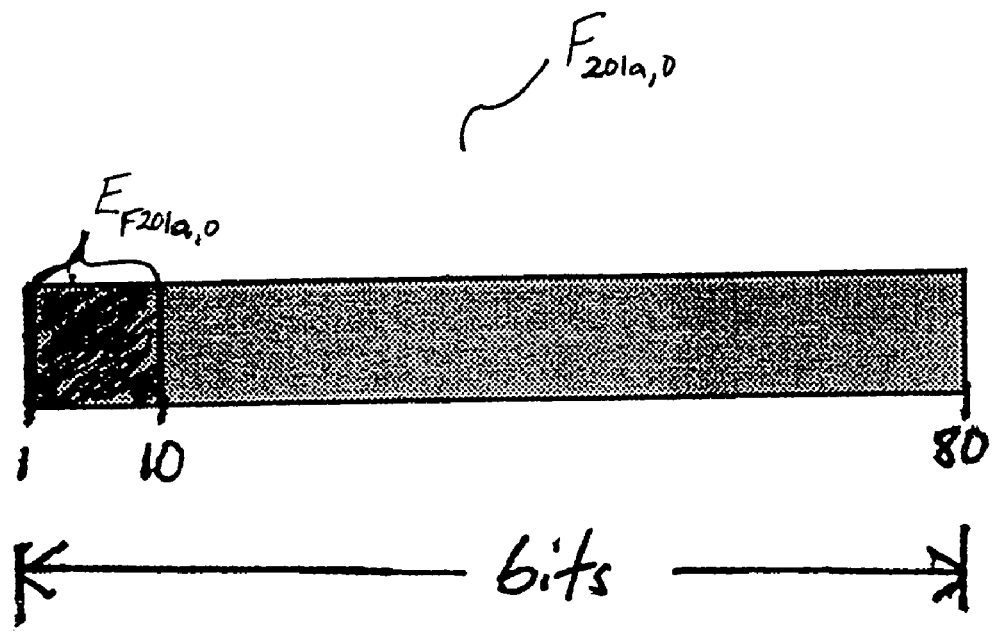
FIG. 4 is an illustrative example of an error burst within a frame.

For purposes of this example, assume that frame $F_{201a,0}$ comprises probable error burst $E_{F201a,0}$, shown in FIG. 4, which may have occurred either during transmission of frame $F_{201a,0}$ from the mobile 300 to the base station 201a or during decoding of $F_{201a,0}$ by the base station 201a. As shown in FIG. 4, frame $F_{201a,0}$ comprises eighty bits. Error burst $E_{F201a,0}$ is located within the first through tenth bits of frame $F_{201a,0}$.

Bit numbers in frame $F_{201a,0}$ may be derived/assigned by identifying a reference bit, such as bit $Z_0$ of byte $Y_0$ (see FIG. 3), as the first bit and counting forward through each bit of bytes $Y_0$–$Y_n$. It should be understood that the location of error burst $E_{F201a,0}$ in FIG. 4 is by way of example only, as error bursts may occur within any part of frame $F_{201a,0}$.

Continuing with the operation of base station 201a, while frame $F_{201a,0}$ is being decoded, base station 201a is adapted to generate reliability information (known as "soft output information") associated with decoded bits within the frame $F_{201a,0}$. This soft output information, as its name implies, is based on a soft metric of frame quality. The soft output information may be generated using one of several known decoding methods. These decoding methods may comprise, for example, Viterbi soft output decoding for convolutional codes, MAP decoding for convolutional codes or soft output decoding for Turbo codes.

In an illustrative embodiment of the present invention, base station 201a is adapted to identify probable error burst $E_{F201a,0}$ based on the soft output information. In other words, base station 201a is adapted to determine specific bits within frame $F_{201a,0}$ that likely comprise error burst $E_{F201a,0}$. An error burst is referred to as "probable", because the results of soft output decoding are not 100% reliable due to "noise", meaning that error bursts may not always be accurately identified. As was just mentioned above, soft output information comprises information about the reliability of each bit within frame $F_{201a,0}$. Realizing this, the present inventors discovered that base stations, like base station 201a, can be adapted to identify a probable starting location and length of error burst $E_{F201a,0}$. More specifically, the inventors envision embodiments of the present invention where base stations, like base station 201a, are adapted to generate an error burst representation (hereafter "representation") $R_{F201a,0}$ associated with the starting location and the length of the error burst $E_{F201a,0}$. Therefore, base station 201a can be adapted to store the representation $R_{F201a,0}$ within frame $F_{201a,0}$. By storing representation $R_{F201a,0}$ within frame $F_{201a,0}$, it can be said that base station 201a is adapted to generate an "enhanced" frame $F_{201a,0}$. In another embodiment of the present invention, base station 201a can be adapted to store representation $R_{F201a,0}$ within the frame quality indicator field FQ of enhanced frame $F_{201a,0}$.

Figure 5:
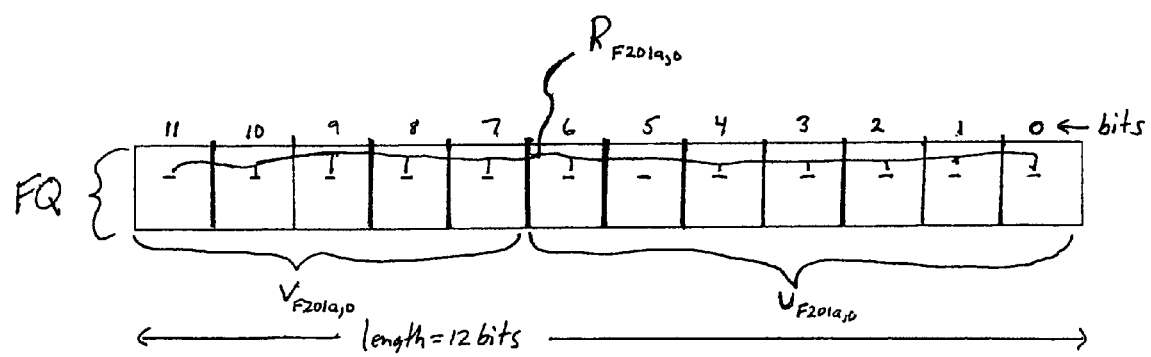
FIG. 5 is an illustrative example of an error burst representation generated according to one embodiment of the present invention.

FIG. 5 provides a further illustrative example of a representation $R_{F201a,0}$ stored within frame quality indicator field FQ. Referring to FIG. 5, the representation $R_{F201a,0}$ comprises an error-start indicator $u_{F201a,0}$ and an error-length indicator $v_{F201a,0}$. Error-start indicator $u_{F201a,0}$ comprises a first range of bits indicating the starting location (i.e., starting bit number) of the error burst $E_{F201a,0}$. Error-length indicator $v_{F201a,0}$ comprises a second range of bits indicating the length (i.e., number of bits) of the burst $E_{F201a,0}$. According to one embodiment of the invention, error-start indicator $U_{F201a,0}$ and error-length indicator $v_{F201a,0}$ comprise binary code.

As previously stated, each frame quality indicator field FQ comprises a length of twelve bits. This means that a representation $R_{F201a,0}$ comprising a length of 12 bits can be stored within a single field FQ. FIG. 5 depicts representation $R_{F201a,0}$ as a single row of bits. The representation $R_{F201a,0}$ is shown in this manner to simplify matters. In actuality, a representation will have to be formatted to fit a field FQ. In the example shown in FIG. 3, this will require the use of two consecutive rows of bits, because each row of bits is limited to one byte.

Because frame $F_{201a,0}$ comprises eighty bits, the error-start indicator $u_{F201a,0}$ comprises enough bits to represent any error burst which starts at any bit within the frame $F_{201a,0}$ (i.e., $2^7=127>80$) and to accurately indicate the starting location of error burst $E_{F201a,0}$. The error-length indicator $v_{201a,0}$ comprises the remaining number of bits within the field FQ, or five bits. Thus, the error-length indicator $v_{F201a,0}$ comprises enough bits to accurately indicate any error burst having a length of up to thirty-two bits (i.e., $2^5=32$) and to accurately represent the length of the respective error burst $E_{F201a,0}$. It should be understood that the particular allocation of bits for the frame quality indicator field FQ and for indicators $u_{F201a,0}$ and $v_{F201a,0}$ is by way of example only. Field FQ and indicators $u_{F201a,0}$ and $v_{F201a,0}$ may be made larger or smaller than the lengths provided in this example based upon the typical frame size, bandwidth and processing limitations and/or accuracy requirements for error representations in a specific communications service.

Backtracking somewhat, the methods and systems for identifying and representing error bursts envisioned by the present invention work well whether or not base stations use CRC codes. For example, according to one embodiment of the invention, base station 201a can be adapted to use a CRC code to determine whether frames such as frames $F_{201a,0}$–$F_{201a,k}$ comprise error bursts. In such an embodiment, the CRC code simply uses a binary digit (i.e., "0" or "1") to indicate whether or not the frame comprises errors. The CRC code does not provide any information about the characteristics, such as location or length, of error bursts. When the CRC code indicates that a frame does not comprise errors, base station 201a can be adapted so that it does not generate a representation such as representation $R_{F201a,0}$. When the CRC code indicates that a frame, however, comprises errors, base station 201a can be adapted to use soft output information, as previously described, to identify an error burst such as error burst $E_{F201a,0}$. Base station 201a is then adapted to generate a representation such as representation $R_{F201a,0}$.

It may occur, however, that base station 201a is not adapted to use a CRC code at all. In this event, base station 201a is adapted to reserve an "all-zeroes" value of an error burst representation to indicate that frames are error-free. Any value other than "all-zeroes" indicates an error burst. Therefore, FSU 203 can be adapted to determine whether frames comprise error bursts based on the presence or absence of an "all-zeroes" value.

Referring back to FIG. 2, once the representation $R_{F201a,0}$ has been stored within enhanced frame $F_{201a,0}$, base station 201a is adapted to transfer the enhanced frame $F_{201a,0}$ to SRNC 202 via an IUB interface 33a. After SRNC 202 has received the enhanced frame $F_{201a,0}$, FSU 203 is adapted to process the enhanced frame $F_{201a,0}$ based on its error content. More specifically, FSU 203 is adapted to evaluate a frame quality (hereafter "quality") of the enhanced frame $F_{201a,0}$ by analyzing representation $R_{F201a,0}$. FSU 203 is then adapted to determine whether to accept the enhanced frame $F_{201a,0}$ (e.g., pass the frame on to higher layers in the network). According to one embodiment of the invention, FSU 203 is adapted to evaluate the quality of enhanced frame $F_{201a,0}$ by setting a threshold frame quality (hereafter "threshold") and determining the quality of enhanced frame $F_{201a,0}$ based on the length of error burst $E_{F201a,0}$. According to one embodiment of the invention, the threshold can be associated with a reference error burst length and the quality of frame $F_{201a,0}$ can be evaluated based on the length of error burst $E_{F201a,0}$. Continuing, if the quality of enhanced frame $F_{201a,0}$ is above the threshold, the FSU 203 is adapted to pass the enhanced frame $F_{201a,0}$ on to higher layers in the network. If the quality of the enhanced frame $F_{201a,0}$ is below the threshold, the FSU 203 is adapted to discard the enhanced frame $F_{201a,0}$ and to request a replacement copy of the frame from the base station 201a. Mobile 300 is then adapted to transfer a replacement copy of the enhanced frame $F_{201a,0}$ to base station 201a. Base station 201a is thereafter adapted to transfer an enhanced replacement copy (not shown) of the frame $F_{201a,0}$, which comprises an error burst representation, to SRNC 202. The replacement copy of the enhanced frame $F_{201a,0}$ comprises the same data and format as frame $F_{201a,0}$ (but not necessarily the same errors). FSU 203 is then adapted to repeat substantially the same process as described above with respect to the replacement copy.

Because representation $R_{F201a,0}$ comprises information about the probable location and length of error burst $E_{F201a,0}$, FSU 203 can be adapted to determine, with some degree of probability, the specific fields and sections within the frame $F_{201a,0}$ that contain errors. Thus FSUs, such as FSU 203, envisioned by the present invention can be adapted to select superior quality frames with greater reliability than existing FSUs. More particularly, FSU 203 can be adapted use the representation $R_{F201a,0}$ and the known format of enhanced frame $F_{201a,0}$ to identify the fields and/or sections in which the error burst $E_{F201a,0}$ is probably located (i.e., "location") and to determine the number of bits in those fields and/or sections that contain errors. FSU 203 can therefore be adapted to set an adjustable threshold associated with one of a plurality of reference error burst lengths and reference error burst locations (i.e., a reference error burst length can be adjusted based on the fields and/or sections in which an error burst is located). FSU 203 can be further adapted to evaluate the quality of enhanced frame $F_{201a,0}$ based on the location and length of error burst $E_{F201a,0}$. Evaluating the quality of enhanced frame $F_{201a,0}$ in this manner effectively "weighs" fields and/or sections according to their importance.

According to yet another embodiment of the invention, FSU 203 can be adapted to generate a "combined" frame. The process of generating a combined frame can also be called "partial-frame combining". In this embodiment of the invention, a combined frame is a frame that is generated by combining an "acceptable" portion (i.e., a portion comprising a minimal amount of errors) of an enhanced frame and an acceptable portion of at least one copy of the enhanced frame. In an ideal case, the acceptable portions are error-free and combining the acceptable portions generates an error-free, combined frame. However, it should be understood that it is not always possible to generate an error-free, combined frame. The ability to generate an error-free, combined frame depends on the distribution of error bursts within particular enhanced frames and enhanced frame copies. Even though an error-free, combined frame cannot always be generated, partial-frame combining often results in the generation of a combined frame that is of higher quality than an original enhanced frame.

In embodiments of the present invention that comprise partial-frame combining, FSU 203 is first adapted to evaluate the quality of an enhanced frame such as enhanced frame $F_{201a,0}$ in one of the ways described in the above embodiments. FSU 203 is then adapted to pass the enhanced frame on to higher layers if the quality of the enhanced frame is above the threshold. If the quality of enhanced frame $F_{201a,0}$ is below the threshold, FSU 203 is adapted to request at least one copy of the enhanced frame ("enhanced frame copy") from mobile 300 via base station 201a.

Figure 6:
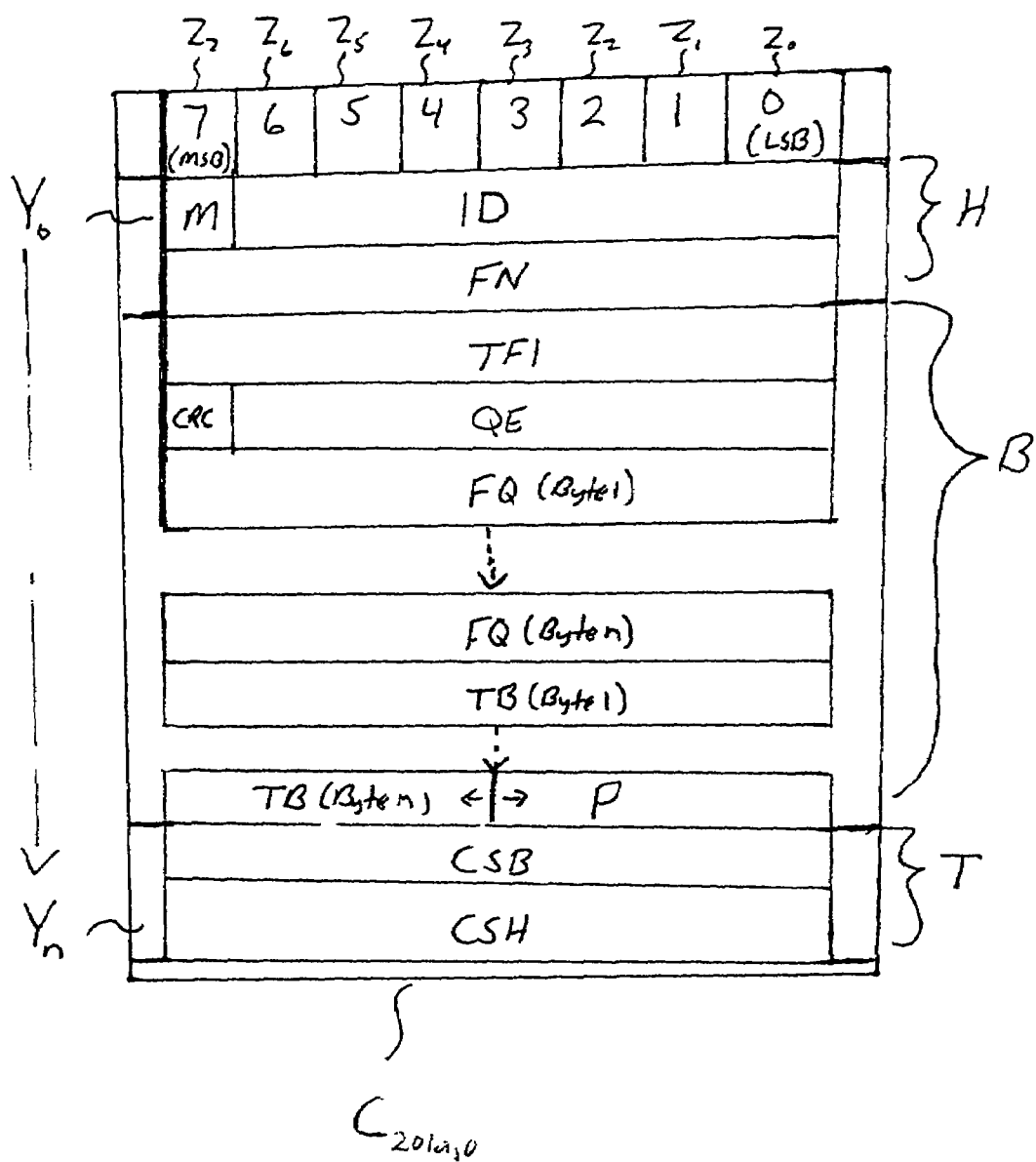
FIG. 6 is another illustrative example of a frame generated according to one embodiment of the present invention.

Assuming that the quality of enhanced frame $F_{201a,0}$ is below the threshold and that the FSU 203 must then request an enhanced frame copy, mobile 300 is adapted to transfer a frame copy $C_{201a,0}$ to base station 201a in substantially the same way as previously described with respect to frame $F_{201a,0}$. Frame copy $C_{201a,0}$ is shown in FIG. 2 and FIG. 6, and comprises the same data, structure and format (but not necessarily the same errors) as frame $F_{201a,0}$. Base station 201a is then adapted to demodulate and decode the frame copy $C_{201a,0}$ and to identify a probable error burst $E_{C201a,0}$ within the frame copy $C_{201a,0}$ using substantially the same process described above with respect to frame $F_{201a,0}$.

Figure 7:
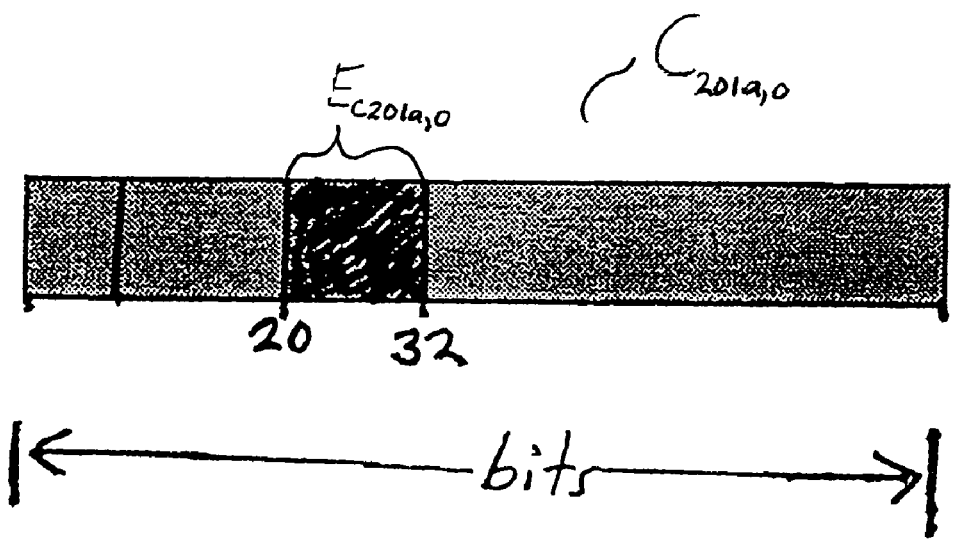
FIG. 7 is another illustrative example of an error burst within a frame.
Figure 8:
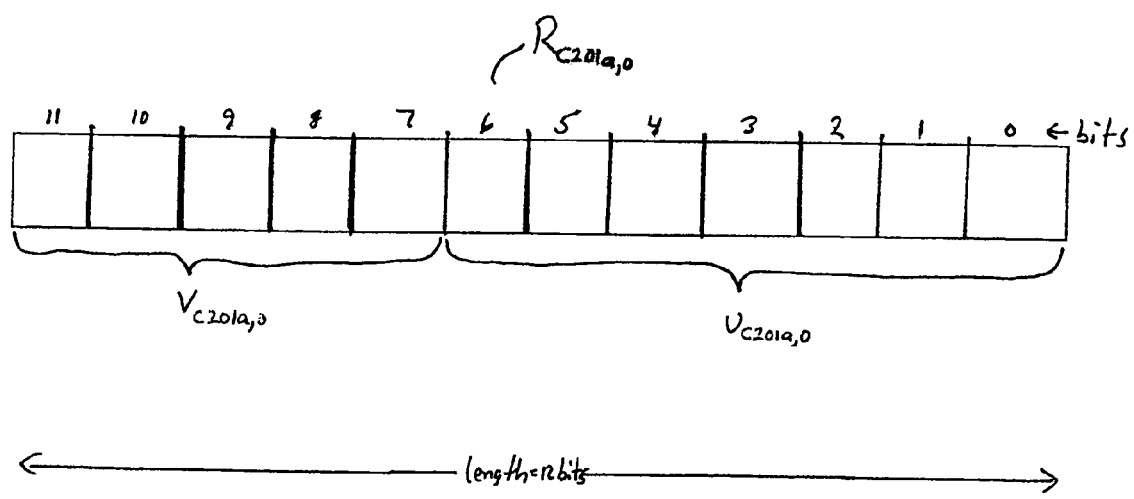
FIG. 8 is an additional illustrative example of an error burst representation generated according to one embodiment of the present invention.

As shown in FIG. 7, probable error burst $E_{C201a,0}$ is located within the twentieth through thirty-second bits of frame copy $C_{201a,0}$. Base station 201a is adapted to generate an enhanced frame copy $C_{201a,0}$ using substantially the same process as used to generate enhanced frame $F_{201a,0}$. Enhanced frame copy $C_{201a,0}$ comprises frame copy error burst representation $R_{C201a,0}$, shown in FIG. 8, associated with the starting location and length of error burst $E_{C201a,0}$. Representation $R_{C201a,0}$ comprises error-start indicator $u_{C201a,0}$ and error length indicator $v_{C201a,0}$. Indicators $u_{C201a,0}$ and $v_{C201a,0}$ are analogous to indicators $u_{F201a,0}$ and $v_{F201a,0}$. Continuing, base station 201a is adapted to transfer the enhanced frame copy $C_{201a,0}$ to SRNC 202.

When SRNC 202 receives the enhanced frame copy $C_{201a,0}$, FSU 203 is adapted to evaluate the quality of the enhanced frame copy $C_{201a,0}$ by analyzing representation $R_{C201a,0}$ and to further process enhanced frame copy $C_{201a,0}$ in substantially the same way as described above with respect to enhanced frame $F_{201a,0}$. If the quality of the enhanced frame copy $C_{201a,0}$ is above a threshold, FSU 203 is adapted to pass the enhanced frame copy $C_{201a,0}$ on. If the quality of the enhanced frame copy is below the threshold, FSU 203 is adapted to generate a "combined" frame by combining an acceptable portion of the enhanced frame $F_{201a,0}$ with an acceptable portion of the enhanced frame copy $C_{201a,0}$.

Assuming that the quality of enhanced frame copy $C_{201a,0}$ is below the threshold, FSU 203 is adapted to generate a combined frame. The specifics relating to how a combined frame is generated from an enhanced frame, such as frame $F_{201a,0}$, and an enhanced frame copy, such as copy $C_{201a,0}$, can be better understood through the use of the following example.

Figure 9:
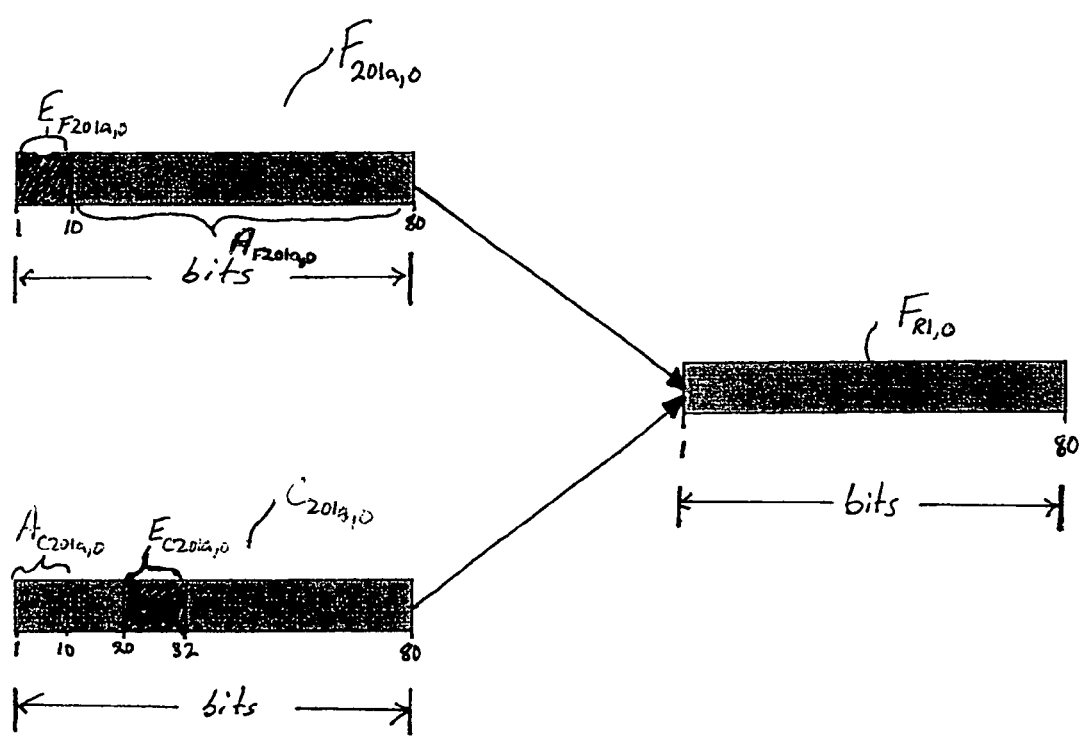
FIG. 9 is an illustrative example of a method for generating a combined frame according to one embodiment of the present invention.

Referring to FIG. 9, FSU 203 is adapted to identify an acceptable portion $A_{F201a,0}$ of frame $F_{201a,0}$ by analyzing representation $R_{F201a,0}$. Acceptable portion $A_{F201a,0}$ comprises the eleventh through eightieth bits of the frame $F_{201a,0}$. At the same time, FSU 203 is adapted to identify an acceptable portion $A_{C201a,0}$ of frame copy $C_{201a,0}$ by analyzing representation $R_{C201a,0}$. Acceptable portion $A_{C201a,0}$ comprises the first through tenth bits of the frame copy $C_{201a,0}$. FSU 203 is then adapted to combine acceptable portions $A_{F201a,0}$ and $A_{C201a,0}$ to construct a combined frame $F_{R1,0}$.

If the quality of the combined frame $F_{R1,0}$ is above the threshold, the combined frame $F_{R1,0}$ is passed on. If the quality of the combined frame $F_{R1,0}$ is below the threshold, FSU 203 is adapted to request a second frame copy (not shown) comprising the same data as the frame $F_{201a,0}$, and is adapted to repeat substantially the same frame selection process as described above using the second frame copy. In the current example, combined frame $F_{R1,0}$ is error-free. Therefore, even if FSU 203 sets an extremely high threshold, combined frame $F_{R1,0}$ will be passed on to higher layers in the network.

Partial-frame combining is not limited to situations in which there is a single enhanced frame and a single enhanced frame copy. A combined frame can be generated from an enhanced frame and multiple enhanced frame copies as well. Accordingly, FSU 203 can be adapted to request multiple frame copies, such as frame COPY $C_{201a,0}$. FSU 203 can then be adapted to identify and combine acceptable portions, such as acceptable portions $A_{F201a,0}$ and $A_{C201a,0}$, of an enhanced frame and multiple enhanced frame copies to construct a combined frame, such as frame $F_{R1,0}$.

Figure 10:
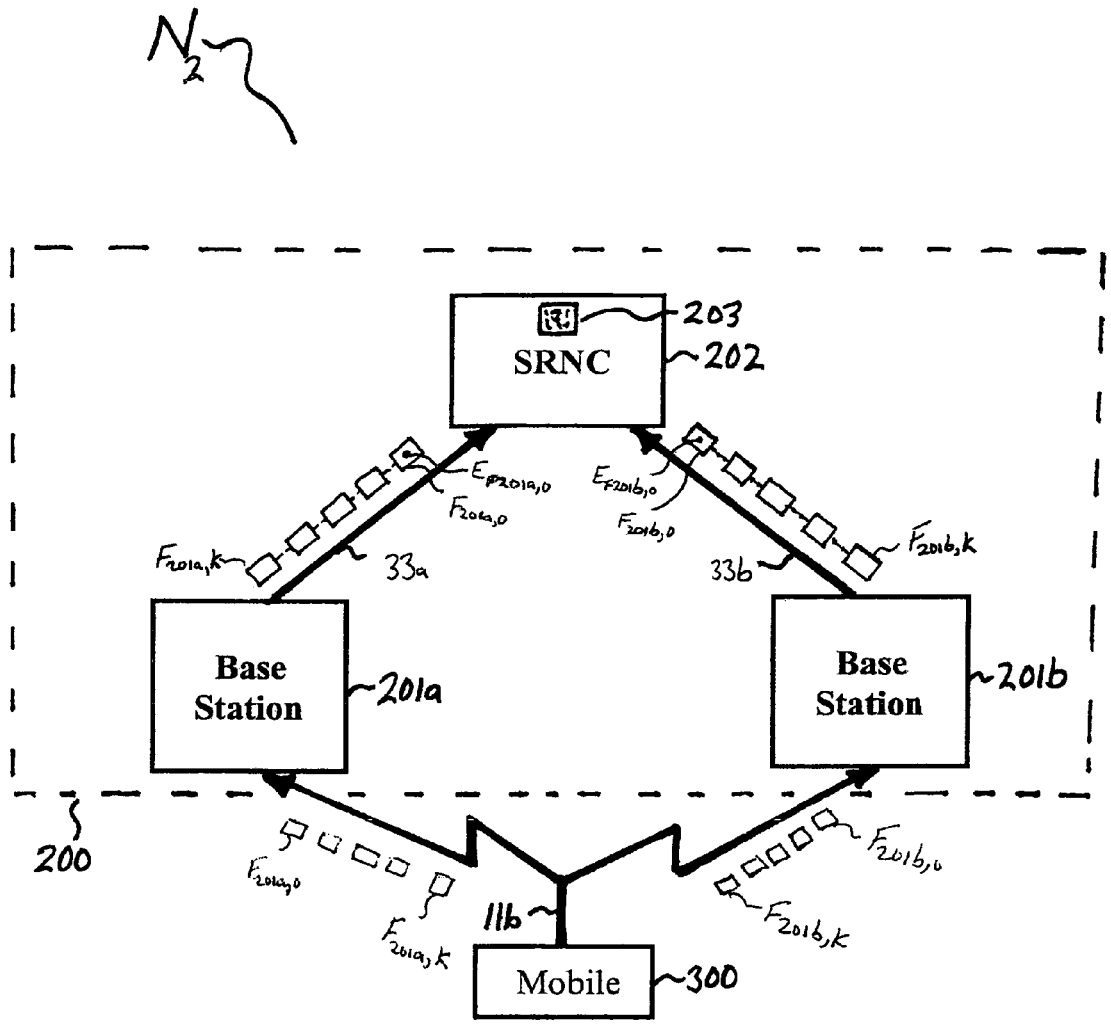
FIG. 10 is a representation of a UMTS sub-network in a soft-handoff mode according to one embodiment of the present invention.

Partial-frame combining is particularly useful when a mobile is in a soft handoff mode. FIG. 10 is a simplified representation of soft-handoff communications within a communications sub-network $N_2$ that comprises access network 200 and mobile 300, according to one embodiment of the present invention. It should be noted that FIG. 10 uses similar reference numbers as in FIG. 2. This is done to indicate the use of components or devices adapted to carry out some of the same features and functions described above. Access network 200 comprises primary base station 201a, parallel base station 201b and SRNC 202. Base station 201b is a novel base station comprising features and functions identical to those of base station 201a. SRNC 202 comprises FSU 203.

During soft hand-off, a primary base station and at least one parallel base station communicate simultaneously with the mobile 300. Mobile 300 is adapted to simultaneously transmit primary frames $F_{201a,0}$–$F_{201a,k}$ to primary base station 201a and transmit "parallel" frames $F_{201b,0}$–$F_{201b,k}$ to parallel base station 201b via wireless link 11b. For purposes of this embodiment, primary frames $F_{201a,0}$–$F_{201a,k}$ are the same as frames $F_{201a,0}$–$F_{201a,k}$ of FIG. 2. Parallel frames $F_{201b,0}$–$F_{201b,k}$ are counterparts of primary frames $F_{201a,0}$–$F_{201a,k}$. A primary frame $F_{201a,0}$–$F_{201a,k}$ transmitted to base station 201a and a parallel frame $F_{201b,0}$–$F_{201b,k}$ transmitted to base station 201b during the same time interval comprise the same data, or transport blocks. Thus, it can be said that primary frames $F_{201a,0}$–$F_{201a,k}$ and parallel frames $F_{201b,0}$–$F_{201b,k}$ are "copies" of one another (i.e., frame $F_{201a,0}$ and frame $F_{201b,0}$ are copies of each other, and so on). However, the copies may not be identical due to transmission and/or decoding errors. It should be noted that, although base station 201a is designated as a primary base station and base station 201b is designated as a parallel base station in this example, either of base stations 201a and 201b can be either a primary base station or a parallel base station in other examples.

Figure 11:
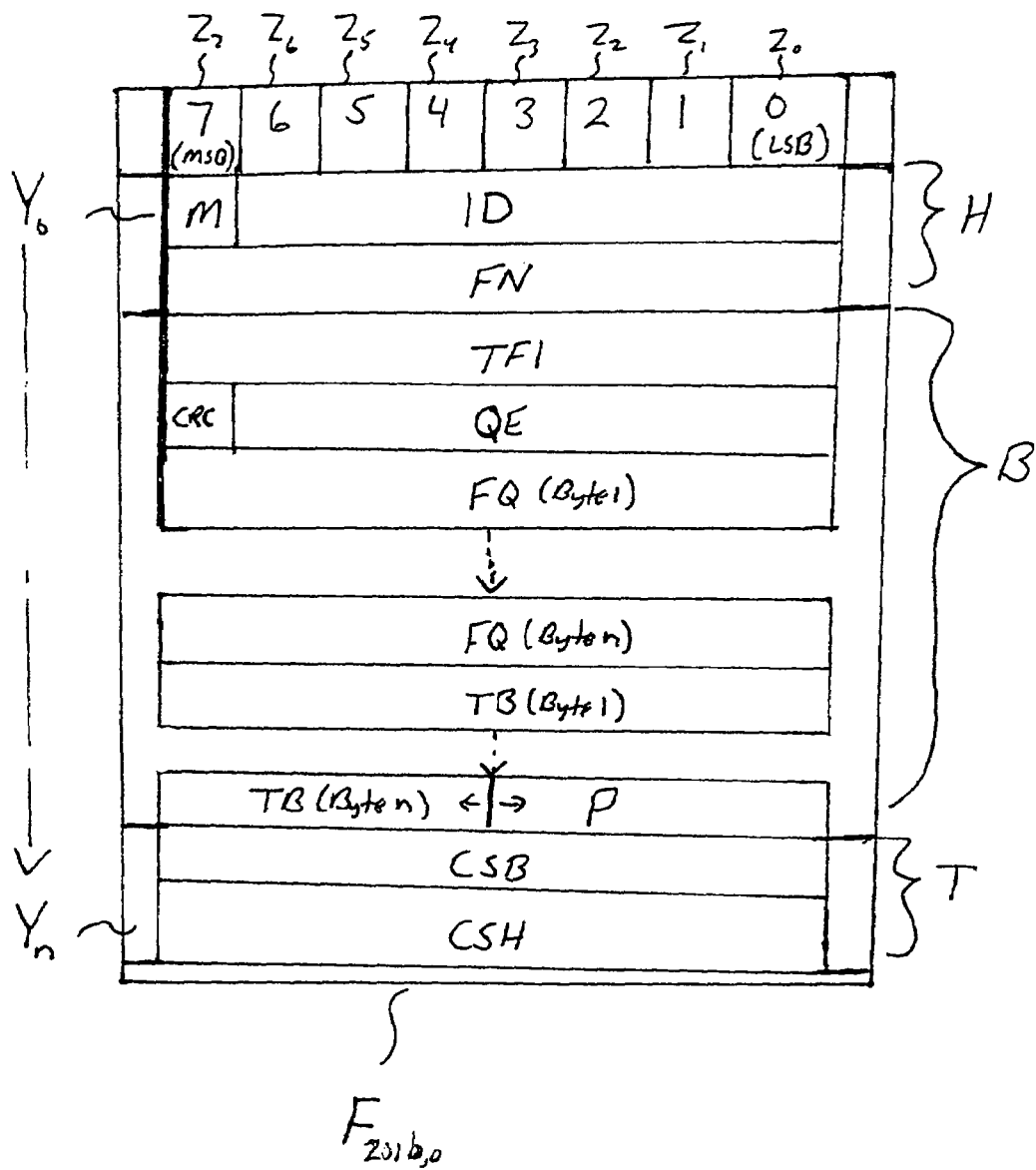
FIG. 11 is another illustrative example of a frame generated according to one embodiment of the present invention.
Figure 12:
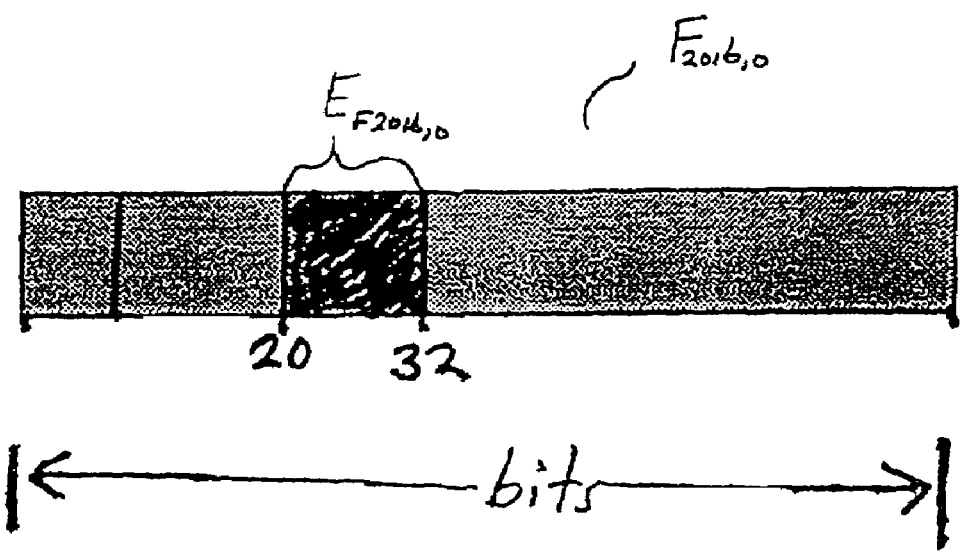
FIG. 12 is another illustrative example of an error burst within a frame.

Consider the operation of sub-network $N_2$ with respect to a primary frame $F_{201a,0}$ and a parallel frame $F_{201b,0}$. Primary frame $F_{201a,0}$ is shown in FIG. 3. Parallel frame $F_{201b,0}$ is shown in FIG. 11 and comprises the same data, structure and format as primary frame $F_{201a,0}$. Primary frame $F_{201a,0}$ comprises probable error burst $E_{F201a,0}$, as previously described and shown in FIG. 4. Parallel frame $F_{201b,0}$ comprises an error burst $E_{F201b,0}$ located within the twentieth through thirty-second bits of parallel frame $F_{201b,0}$. Error burst $E_{F201b,0}$ is shown in FIG. 12.

Figure 13:
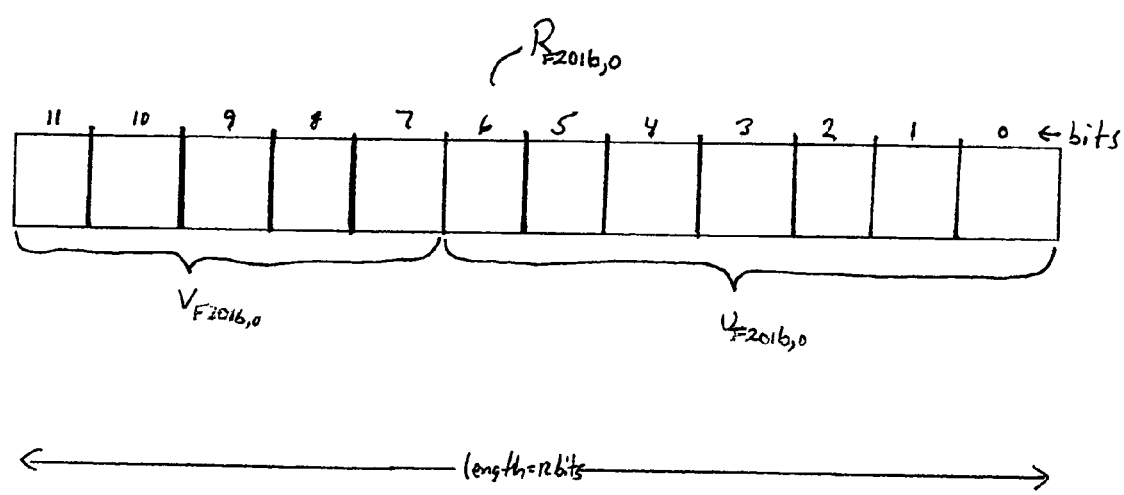
FIG. 13 is another illustrative example of an error burst representation generated according to yet another embodiment of the present invention.

In FIG. 10, base stations 201a and 201b operate in substantially the same way as base station 201a operates in the embodiment shown in FIG. 2. Base station 201a is adapted to generate an enhanced primary frame $F_{201a,0}$, comprising a stored primary frame error burst representation $R_{F201a,0}$, in the same manner as described above. Representation $R_{F201a,0}$ is shown in FIG. 5. Base station 201b is adapted to generate an enhanced frame $F_{201b,0}$, comprising a stored parallel frame error burst representation $R_{F201b,0}$, in the same manner as described with respect to enhanced frame $F_{201a,0}$. Representation $R_{F201b,0}$, shown in FIG. 13, comprises an error-start indicator $U_{F201b,0}$ and an error-length indicator $v_{F201b,0}$. Indicators $u_{F201b,0}$ and $v_{F201b,0}$ are analogous to indicators $v_{F201a,0}$ and $v_{F201a,0}$ of representation $R_{F201a,0}$. Once primary frame $F_{201a,0}$ and parallel frame $F_{201b,0}$ comprise their respective representations, they can be referred to as enhanced primary frame $F_{201a,0}$ and enhanced parallel frame $F_{201b,0}$.

Base stations 201a and 201b are adapted to transfer enhanced primary frame $F_{201a,0}$ and enhanced parallel frame $F_{201b,0}$, respectively, to SRNC 202 via IUR interface 33b. Upon receiving enhanced primary frame $F_{201a,0}$ and enhanced parallel frame $F_{201b,0}$, FSU 203 is adapted to apply frame selection comprising partial-frame combining. The specifics of how this is done will now be described in detail.

FSU 203 is first adapted to evaluate the quality of enhanced primary frame $F_{201a,0}$ and enhanced parallel frame $F_{201b,0}$ by analyzing representations $R_{F201a,0}$ and $R_{F201b,0}$, respectively. The quality of frames $F_{201a,0}$ and $F_{201b,0}$ is evaluated in one of the ways described in the above embodiments. If the quality of the enhanced primary frame $F_{201a,0}$ is above a threshold and the quality of the enhanced parallel frame $F_{201b,0}$ is below the threshold, the FSU 203 is adapted to pass the primary frame on. If the quality of enhanced primary frame $F_{201a,0}$ is below the threshold, and the quality of the enhanced parallel frame $F_{201b,0}$ is above the threshold, FSU 203 is adapted to pass the enhanced parallel frame $F_{201b,0}$ on. If the qualities of enhanced primary frame $F_{201a,0}$ and enhanced parallel frame $F_{201b,0}$ are above the threshold, FSU 203 is adapted to pass the superior quality frame between frames $F_{201a,0}$ and $F_{201b,0}$ on. On the other hand, if the qualities of the enhanced primary frame $F_{201a,0}$ and the enhanced parallel frame $F_{201b,0}$ are below the threshold, FSU 203 is adapted to generate a combined frame.

Figure 14:
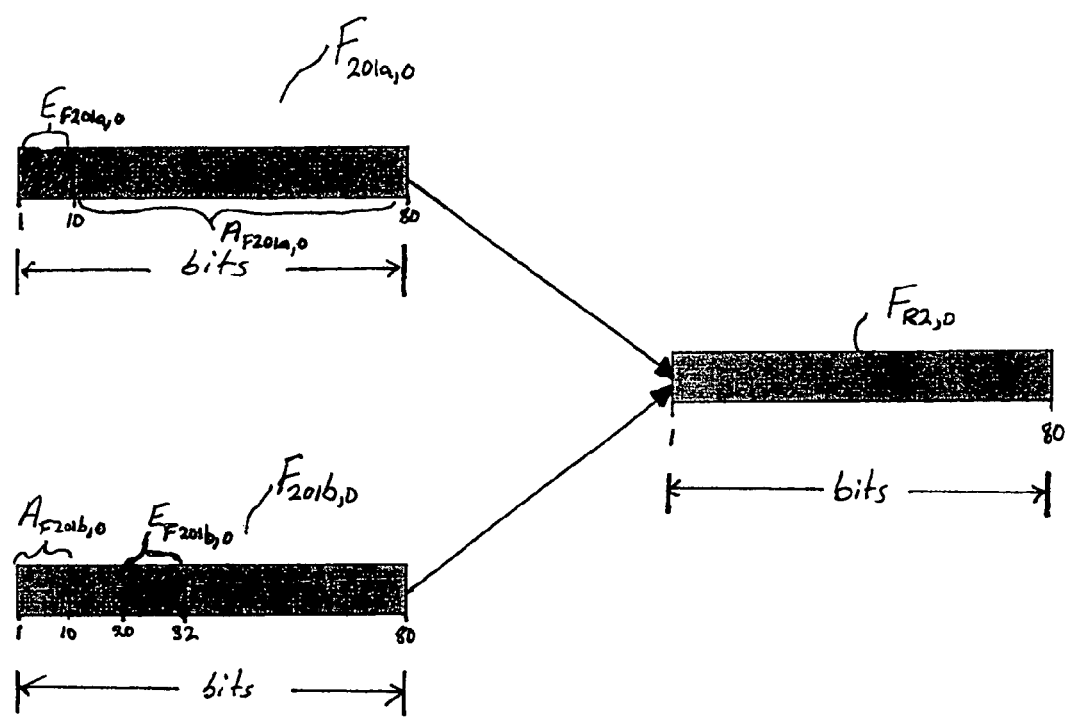
FIG. 14 is an another illustrative example of a method for generating a combined frame according to one embodiment of the present invention.

Assuming that the qualities of enhanced primary frame $F_{201a,0}$ and enhanced parallel frame $F_{201b,0}$ are below the threshold, FSU 203 is adapted to generate a combined frame by combining an acceptable portion of the enhanced primary frame $F_{201a,0}$ with an acceptable portion of the enhanced parallel frame $F_{201b,0}$. Referring to FIG. 14, FSU 203 is adapted to identify acceptable portion $A_{F201a,0}$ of frame $F_{201a,0}$ and an acceptable portion $A_{F201b,0}$ of frame $F_{201b,0}$ by analyzing representations $R_{F201a,0}$ and $A_{F201b,0}$, respectively. In this example, acceptable portion $A_{F201a,0}$ comprises the eleventh through eightieth bits of frame $F_{201a,0}$ and acceptable portion $A_{F201b,0}$ comprises the first through tenth bits of frame $F_{201b,0}$. Continuing, FSU 203 is adapted to combine acceptable portions $A_{F201a,0}$ and $A_{F201b,0}$ to generate a combined frame $F_{R2,0}$.

If the combined frame $F_{R2,0}$ is above the threshold quality, FSU 203 is adapted to pass the combined frame on to higher layers in the network. If the combined frame $F_{R2,0}$ is below the threshold quality, FSU 203 is adapted to discard the combined frame $F_{R2,0}$ and to request a copy of the primary frame and a copy of the parallel frame from base stations 201a and 201b, respectively. An enhanced copy of the primary frame (not shown) and an enhanced copy of the parallel frame (not shown) are then transferred to SRNC 202 in the same manner as enhanced frame copy $C_{201a,0}$ is transferred in an embodiment of FIG. 2. FSU 203 is then adapted to re-apply substantially the same process to the enhanced copy of the primary frame and the enhanced copy of the parallel frame.

The sub-network $N_2$ shown in FIG. 10 comprises two base stations 201a and 201b in communication with mobile 300. It should be understood, however, that the invention is not limited to this embodiment. It is possible for a mobile such as mobile 300 to communicate with more than two such base stations during soft-handoff operation. In such a situation, an FSU, such as FSU 203, would receive an enhanced primary frame and more than two enhanced parallel frames. Thereafter, FSU 203 could be adapted to carry out partial-frame combining wherein acceptable portions of the enhanced primary frame and enhanced parallel frames are combined to construct a combined frame.

The effectiveness of the present methods and systems for applying frame selection depends upon the length of the frame quality indicator field FQ (which must be limited to prevent a significant reduction in frame processing and transmission rates) with respect to the size of a corresponding enhanced frame, such as frames $F_{201a,0}$ and $F_{201b,0}$. This is particularly true when generating combined frames. In order to construct an error-free frame, such as frames $F_{R1,0}$ and $F_{R2,0}$, it is necessary to: identify all error bursts that occur within enhanced frames and enhanced frame copies; generate representations similar to representations $R_{F201a,0}$, $R_{F201b,0}$ and $R_{C201a,0}$ for all of the error bursts; and combine acceptable portions, such as acceptable portions of the frames based upon the representations. One problem exists when an enhanced frame or enhanced frame copy is relatively large and its frame quality indicator field FQ is relatively short. In this case, it may not be possible to represent all potential starting locations of error bursts or it may not be possible to accurately represent long error bursts. There simply may not be enough bits within the frame quality indicator field FQ to fully represent all potential errors. Depending on the particular allocation of bits for an error-start indicator and an error-length indicator, an error burst representation may only be capable of representing the starting location of an error burst which starts within a limited range of bits within the frame and/or may only be able to represent a segment of an error burst, as opposed to its entire length.

Furthermore, another problem may occur when enhanced frames comprise multiple error bursts. According to other embodiments of the invention, base stations 201a and 201b are adapted to generate and store multiple error burst representations such as representations $R_{F201a,0}$ and $R_{F201b,0}$ within the frame quality indicator field FQ of a particular enhanced frame in order to represent multiple error bursts. However, limitations on the size of the field FQ may make it difficult or impractical to accurately represent multiple error bursts. Despite the potential problems associated with representing error bursts, partial-frame combining envisioned by the present invention will often result in generating a combined frame of significantly improved quality.

According to other embodiments of the invention, problems associated with fully representing error bursts are addressed by applying "unequal error recovery". Unequal error recovery comprises minimizing errors only within the most critical fields and/or sections of an enhanced frame. For example, the header H (see FIG. 3) is usually the most critical section. The loss of a header H may corrupt an entire voice burst for audio services, or an entire picture for video services.

According to one embodiment of the invention, base stations 201a and 201b can be adapted to recognize situations in which they cannot fully or accurately represent error bursts within an enhanced frame. In such situations, base stations 201a and 201b can be adapted to generate and store an error burst representation that is associated only with a particular field or section, such as header H, of an enhanced frame such as frames $F_{201a,0}$, and $F_{201b,0}$. For example, in constant bit-rate services such as audio and video, the header H has a fixed location (usually at the beginning of a frame) and a fixed length. It is therefore easy to identify the header H prior to the generation of an error burst representation and to provide greater protection against error bursts that occur within the header H. Since the header H comprises significantly fewer bits than an entire frame, it is likely that a frame quality indicator field FQ will not have to be excessively long in order to store one or more error burst representations which fully and accurately represent all error bursts that occur within the header H.

Accordingly, FSU 203 can be adapted to process frames using unequal error recovery. According to an additional embodiment of the network $N_1$ shown in FIG. 2, FSU 203 can be adapted to evaluate the quality of an enhanced frame, such as enhanced frame $F_{201a,0}$, based on the quality of a particular field or section (e.g., header H) within the enhanced frame. According to yet another embodiment of sub-network $N_1$, FSU 203 can be adapted to generate a combined frame by combining an acceptable portion within a particular field or section (e.g., header H) of an enhanced primary frame, similar to portion $A_{F201a,0}$ of frame $F_{201a,0}$, and an acceptable portion within the same field or section of an enhanced frame copy, similar to portion $A_{C201a,0}$ of frame $C_{201a,0}$. Similarly, according to an additional embodiment of the sub-network $N_2$ shown in FIG. 10, FSU 203 can be adapted to generate a combined frame by combining an acceptable portion within a particular field or section (e.g., header H) of an enhanced primary frame, similar to portion $A_{F201a,0}$ of frame $F_{201a,0}$, and an acceptable portion within the same field or section of an enhanced parallel frame, similar to portion $A_{F201b,0}$ of frame $F_{201b,0}$.

Applying unequal error recovery does more than reduce bit-error rates. It also improves decoding performance by focusing error recovery resources (e.g., processing space and time) only on the most critical sections of frames. Such resources are not wasted on less critical sections of the frames.

Novel base stations and FSUs envisioned by the present invention may comprise a number of devices. For example, base stations 201a and 201b may comprise programmed devices such as microprocessors and/or memory units, or one or more integrated circuits ("ICs") adapted to, among other things, generate error burst representations, such as representations $R_{F201a,0}$, $R_{F201b,0}$ and $R_{C201a,0}$, and adapted to store the representations within enhanced frames and enhanced frame copies, such as frames $R_{F201a,0}$, $R_{F201b,0}$ and frame copy $C_{F20a,0}$. Likewise, FSU 203 may comprise programmed devices such as microprocessors and/or memory units, or one or more ICs adapted to perform the same features, functions and processes described in the various embodiments of the present invention above. In addition, base stations 201a and 201b and FSU 203 may comprise programmed mediums, such as hard disks, floppy disks or CD-ROMs, which comprise program code for performing substantially the same features, functions and processes of the present invention. The program code may further comprise customized subroutines, which can be altered based on various characteristics of the communications network.

The present invention provides reduced error rates and improved frame selection performance by generating, storing and analyzing novel representations of error bursts. According to the present invention, frame selection is further improved by generating novel combined frames. Although the present invention focuses on frame selection in wireless communications networks, the invention is not so limited. The methods and systems of the present invention are useful in any communications network or device that makes use of partially errored frames. Further advantages of the present invention will be readily apparent to those skilled in the art.

It is to be understood that changes and variations may be made without departing from the scope and spirit of the invention as defined by the claims that follow.

The invention claimed is:

1. A frame selection system in a wireless communications system comprising:
    a base station adapted to,
    generate at least one enhanced frame comprising at least one error burst representation;
    generate at least one enhanced frame copy comprising substantially the same data, structure and format of said at least one enhanced frame having at least one error burst representation; and
    a frame selection unit adapted to,
    combine an acceptable portion of the enhanced frame with an acceptable portion of the enhanced frame copy based on the error burst representations to form a combined frame of a higher quality than the enhanced frame at least during a soft-handoff.

2. The system of claim 1 wherein the base station is further adapted to generate a primary enhanced frame.

3. The system of claim 1 wherein the base station is further adapted to generate a parallel enhanced frame.

4. The system of claim 1 wherein the base station is further adapted to store each of the error burst representations within a respective frame.

5. The system of claim 4 wherein the base station is further adapted to store each of the error burst representations within a respective frame quality indicator field.

6. The system of claim 1 wherein each of the error burst representations comprises an error-start indicator and an error-length indicator.

7. The system of claim 6, wherein each of the error-start indicators and the error-length indicators comprise binary code.

8. The system of claim 1, wherein the base station comprises a wireless communications base station.

9. The system of claim 1, wherein the error burst representations are associated with a field or section of a respective frame.

10. The system of claim 1 wherein the frame selection unit is further adapted to evaluate a frame quality of the enhanced frame.

11. The system of claim 10 wherein the frame selection unit is further adapted to analyze at least one error burst representation within the enhanced frame.

12. The system of claim 10 wherein the frame selection unit is further adapted to evaluate the frame quality of the enhanced frame based on a quality of a field or section of the enhanced frame.

13. The system of claim 10 wherein the wherein the frame selection unit device is further adapted to generate a combined frame.

14. The system of claim 1 wherein the frame selection unit is further adapted to:
    accept the enhanced frame if a frame quality of the enhanced frame is above a threshold; and discard the enhanced frame and request a replacement copy of the enhanced frame if the frame quality of the enhanced frame is below the threshold.

15. The system of claim 14, wherein the threshold is associated with a reference error burst length.

16. The system of claim 14, wherein the threshold comprises an adjustable threshold associated with one of a plurality of reference error burst lengths and reference error burst locations.

17. The system of claim 1 wherein the frame selection unit is further adapted to combine an acceptable portion of an enhanced primary frame with an acceptable portion of an enhanced parallel frame.

18. The system of claim 1 wherein the frame selection unit is further adapted to combine an acceptable portion from a field or section of the enhanced frame and an acceptable portion from a same field or section of the enhanced frame copy.

19. The system of claim 1 wherein the frame selection unit is further adapted to combine an acceptable portion from a field or section of an enhanced primary frame and an acceptable portion from a same field or section of an enhanced parallel frame.

20. A frame selection unit in a wireless communications system adapted to analyze at least one error burst representation within an enhanced frame;
analyze at least one error burst representation within an enhanced frame;
analyze at least one error burst representation within an enhanced frame copy comprising substantially the same data, structure and format of said enhanced frame;
combine an acceptable portion of the enhanced frame with an acceptable portion of the enhanced frame copy based on the respective error burst representations to form a combined frame of higher quality than the enhanced frame at least during a soft-handoff.

21. The frame selection unit of claim 20, further adapted to:
accept the enhanced frame if a frame quality of the enhanced frame is above a threshold; and
discard the enhanced frame and request a replacement copy of the enhanced frame if the frame quality of the enhanced frame is below the threshold.

22. The frame selection unit device of claim 21, wherein the threshold is associated with a reference error burst length.

23. The frame selection unit of claim 21, wherein the threshold comprises an adjustable threshold associated with one of a plurality of reference error burst lengths and reference error burst locations.

24. The frame selection unit of claim 20, further adapted to evaluate a frame quality of the enhanced frame based on a quality of a field or section of the enhanced frame.

25. The frame selection unit of claim 20, further adapted to generate a combined frame.

26. The frame selection unit of claim 20 further adapted to combine an acceptable portion of an enhanced primary frame with an acceptable portion of an enhanced parallel frame.

27. The frame selection unit of claim 20 further adapted to combine an acceptable portion from a field or section of the enhanced frame and an acceptable portion from a same field or section of the enhanced frame copy.

28. The frame selection unit of claim 20 further adapted to combine an acceptable portion from a field or section of an enhanced primary frame and an acceptable portion from a same field or section of an enhanced parallel frame.

29. A frame selection unit in a wireless communications system adapted to combine an acceptable portion of an enhanced frame comprising at least one error burst representation that includes an error start indicator and error length indicator with an acceptable portion of an enhanced frame copy having substantially the same data, structure and format of said enhanced frame based on an error burst representation within each frame to form a combined frame of a higher quality than the enhanced frame at least during a soft-handoff.

30. The frame selection unit device of claim 29 further adapted to combine an acceptable portion of an enhanced primary frame with an acceptable portion of an enhanced parallel frame.

31. The frame selection unit of claim 29 further adapted to combine an acceptable portion from a field or section of the enhanced frame and an acceptable portion from a same field or section of the enhanced frame copy.

32. The frame selection unit of claim 29 further adapted to combine an acceptable portion from a field or section of an enhanced primary frame and an acceptable portion from a same field or section of an enhanced parallel frame.

33. The frame selection unit device as in claim 29 further adapted to:
evaluate a frame quality of the enhanced frame based on a quality of a field or section of the enhanced frame; and
evaluate a frame quality of the enhanced frame copy based on a quality of a field or section of the enhanced frame copy.

34. The frame selection unit of claim 33, wherein the device comprises a frame selection unit.

35. A frame selection method comprising:
generating at least one enhanced frame comprising at least one error burst representation;
generating at least one enhanced frame copy having substantially the same data, structure and format of said at least one enhanced frame comprising at least one error burst representation;
combining an acceptable portion of the enhanced frame with an acceptable portion of the enhanced frame copy based on the error burst representations to form a combined frame of a higher quality than the enhanced frame at least during a soft-handoff.

36. The method of claim 35, further comprising generating an enhanced primary frame.

37. The method of claim 35, further comprising generating an enhanced parallel frame.

38. The method of claim 35 further comprising storing each of the error burst representations within a respective frame.

39. The method of claim 38, further comprising storing each of the error burst representations within a respective frame quality indicator field.

40. The method of claim 35 wherein each of the error burst representations comprises an error-start indicator and an error-length indicator.

41. The method of claim 40, wherein each of the error-start indicators and the error-length indicators comprise binary code.

42. The method of claim 35 wherein the error burst representations are associated with a particular field or section of a respective frame.

43. The method of claim 35 further comprising evaluating a frame quality of the enhanced frame.

44. The method of claim 43, further comprising analyzing the at least one error burst representation within the enhanced frame.

45. The method of claim 43, further comprising:
accepting the enhanced frame if the frame quality of the enhanced frame is above a threshold; and
discarding the enhanced frame and requesting a replacement copy of the enhanced frame if the frame quality of the enhanced frame is below the threshold.

46. The method of claim 45, wherein the threshold is associated with a reference error burst length.

47. The method of claim 45, wherein the threshold comprises an adjustable threshold associated with one of a plurality of reference error burst lengths and reference error burst locations.

48. The method of claim 43, further comprising evaluating the frame quality of the enhanced frame based on a quality of a field or section of the enhanced frame.

49. The method of claim 35 further comprising generating a combined frame.

50. The method of claim 35 further comprising an acceptable portion of an enhanced primary frame with an acceptable portion of an enhanced parallel frame.

51. The method of claim 35 further comprising combining an acceptable portion from a field or section of the enhanced frame and an acceptable portion from a same field or section of the enhanced frame copy.

52. The method of claim 35 further comprising combining an acceptable portion from a field or section of an enhanced primary frame and an acceptable portion from a same field or section of an enhanced parallel frame.

53. A frame selection method comprising:
analyzing at least one error burst representation within an enhanced frame;
analyzing at least one error burst representation within an enhanced frame copy having substantially the same data, structure and format of said enhanced frame;
combining an acceptable portion of the enhanced frame with an acceptable portion of the enhanced frame copy based on the error burst representations to form a combined frame of a higher quality than the enhanced frames at least during a soft-handoff.

54. The method of claim 53, further comprising:
accepting the enhanced frame if a frame quality of the enhanced frame is above a threshold; and
discarding the enhanced frame and requesting a replacement copy of the enhanced frame if the frame quality of the enhanced frame is below the threshold.

55. The method of claim 54, wherein the threshold is associated with a reference error burst length.

56. The method of claim 54, wherein the threshold comprises an adjustable threshold associated with one of a plurality of reference error burst lengths and reference error burst locations.

57. The method of claim 53, further comprising evaluating a frame quality of the enhanced frame based on a quality of a field or section of the enhanced frame.

58. The method of claim 53, further comprising generating a combined frame.

59. The method of claim 53 further comprising combining an acceptable portion of an enhanced primary frame with an acceptable portion of an enhanced parallel frame.

60. The method of claim 53 further comprising combining an acceptable portion from a field or section of the enhanced frame and an acceptable portion from a same field or section of the enhanced frame copy.

61. The method of claim 53 further comprising combining an acceptable portion from a field or section of an enhanced primary frame and an acceptable portion from a same field or section of an enhanced parallel frame.

62. A method comprising combining an acceptable portion of an enhanced frame comprising at least one error burst representation that includes an error start indicator and an error length indicator with an acceptable portion of an enhanced frame copy having substantially the same data, structure and format of said at least one enhanced frame based on an error burst representation within each frame to form a combined frame of a higher quality than the enhanced frame at least during a soft-handoff.

63. The method of claim 62 further comprising combining an acceptable portion of an enhanced primary frame with an acceptable portion of an enhanced parallel frame.

64. The method of claim 62 further comprising combining an acceptable portion from a field or section of the enhanced frame and an acceptable portion from a same field or section of the enhanced frame copy.

65. The method of claim 62 further comprising combining an acceptable portion from a field or section of an enhanced primary frame and an acceptable portion from a same field or section of an enhanced parallel frame.

66. The method of claim 62 further comprising:
evaluating a frame quality of the enhanced frame based on a quality of a field or section of the enhanced frame; and
evaluating a frame quality of the enhanced frame copy based on a quality of a field or section of the enhanced frame copy.

* * * * *